US012173258B2

(12) United States Patent
Doucet et al.

(10) Patent No.: US 12,173,258 B2
(45) Date of Patent: Dec. 24, 2024

(54) CONCENTRATED DISSOLVABLE FABRIC SOFTENER SHEETS

(71) Applicant: DIZOLVE GROUP CORPORATION, Moncton (CA)

(72) Inventors: Etienne Doucet, Shediac (CA); Daniel Alberto Carbo Dabove, Moncton (CA); Michel Robichaud, Moncton (CA)

(73) Assignee: DIZOLVE GROUP CORPORATION, Moncton (CA)

( * ) Notice: Subject to any disclaimer, the term of this patent is extended or adjusted under 35 U.S.C. 154(b) by 0 days.

(21) Appl. No.: 18/739,790

(22) Filed: Jun. 11, 2024

(65) Prior Publication Data

US 2024/0327762 A1 Oct. 3, 2024

Related U.S. Application Data

(63) Continuation of application No. PCT/CA2023/051549, filed on Nov. 17, 2023.

(60) Provisional application No. 63/461,617, filed on Apr. 25, 2023, provisional application No. 63/426,807, filed on Nov. 21, 2022.

(51) Int. Cl.

| | |
|---|---|
| ***C11D 1/02*** | (2006.01) |
| ***B08B 3/04*** | (2006.01) |
| ***C11D 1/12*** | (2006.01) |
| ***C11D 1/72*** | (2006.01) |
| ***C11D 1/92*** | (2006.01) |
| ***C11D 3/22*** | (2006.01) |
| ***C11D 3/37*** | (2006.01) |
| ***C11D 17/06*** | (2006.01) |
| ***D06M 15/11*** | (2006.01) |
| ***D06M 15/21*** | (2006.01) |
| ***D06M 17/06*** | (2006.01) |

(52) U.S. Cl.

CPC ................ *C11D 17/06* (2013.01); *C11D 3/37* (2013.01); *D06M 15/11* (2013.01); *D06M 15/21* (2013.01)

(58) Field of Classification Search

CPC .... C11D 1/02; C11D 1/12; C11D 1/72; C11D 1/92; C11D 3/001; C11D 3/2006; C11D 3/2065; C11D 3/22; C11D 3/227; C11D 3/3769; C11D 3/3796; C11D 17/041; C11D 17/042; C11D 17/06; B08B 3/04; D06M 15/11; D06M 15/21; D06M 17/06

See application file for complete search history.

(56) References Cited

U.S. PATENT DOCUMENTS

2020/0277555 A1* 9/2020 Cho ..................... C11D 3/3753
2021/0261892 A1* 8/2021 Xu ......................... A61K 8/416

FOREIGN PATENT DOCUMENTS

KR 2012-0021449 A 3/2012

OTHER PUBLICATIONS

International Search Report & Written Opinion of the International Searching Authority from corresponding PCT Application No. PCT/CN2023/051549, dated Feb. 20, 2024.

* cited by examiner

*Primary Examiner* — Brian P Mruk

(74) *Attorney, Agent, or Firm* — Harness, Dickey & Pierce, P.L.C.

(57) ABSTRACT

The present invention relates to formulations for a concentrated fabric softener, in the form of water-soluble sheets, which can conveniently be used alongside detergent in home laundry washing machines. The formulations comprise combinations of anionic surfactants with cationic and/or anionic polymers which together cooperate to provide a softening effect on textiles. This product format allows for a concentrated product that is comprised in a high proportion of active ingredients, and therefore occupies a much smaller volume and mass for the amount of active ingredient and softening power provided. The performance of the invention is equivalent or superior to comparable dosages of standard liquid 2-in-1 detergent/fabric softener combinations.

8 Claims, No Drawings

CONCENTRATED DISSOLVABLE FABRIC SOFTENER SHEETS

CROSS-REFERENCE TO RELATED APPLICATIONS

This application is a continuation application of PCT Application No. PCT/CA2023/051549 filed on Nov. 17, 2023 which claims priority to U.S. Provisional Application Nos. 63/426,807 filed Nov. 21, 2022 and 63/461,617 filed Apr. 25, 2023. The entire disclosures of the applications identified in this paragraph are incorporated herein by reference.

FIELD

The present invention relates to the field of softening and conditioning products for textiles, for use in household laundry. Disclosed herein are formulations for a highly concentrated fabric softener, in the form of dissolvable solid sheets, which can conveniently be used alongside detergent in home laundry washing machines. This product format allows for a concentrated product that is comprised in a high proportion of active ingredients, and therefore occupies a much smaller volume and mass for the amount of active ingredient and softening power provided. The performance of the invention is equivalent or superior to comparable dosages of standard liquid 2-in-1 detergent/fabric softener combinations.

BACKGROUND

Fabric softening compositions for laundry are ubiquitous, and typically take one of three forms. They may be provided as liquid formulations to be added to the final rinse cycle of a laundry load, "2-in-1" detergent/softener liquid formulations added to the wash cycle, or non-dissolvable sheets that are impregnated with fabric softener, and tumbled with the laundry separately in a dryer. Each of these forms of fabric softeners have drawbacks. Although liquid fabric softeners tend to have greater coverage and contact with all textile surfaces in a laundry load, being mixed and dispersed in rinse water and then agitated with the load, liquid fabric softeners are comprised in large part of water. They are therefore bulky and heavy to ship, and can be inconvenient to store. 2-in-1 detergent/softener liquid formulations also suffer from the same problems associated with their formats as bulky liquids. Non-dissolvable sheets result in the generation of waste, as the spent sheet must be discarded after use. They are also prone to becoming entrapped during the drying cycle in larger items such as sheets and towels, which limits their ability to contact all textile surfaces in the load.

Laundry detergent has become readily available in recent years in dissolvable sheet form, including from the applicant of this patent. However, technical constraints have limited the ability to provide fabric softeners in similar sheet form. Traditional softening active ingredients used in fabric softeners have poor compatibility with structurants needed to make a solid sheet. The term "structurants" is used herein to denote ingredients that contribute to forming a solid matrix in which active ingredients can be incorporated. Examples of water-soluble structurants that may be used in dissolvable sheets for laundry include starch and polyvinyl alcohol, which provide bulk and flexibility to the sheet.

The main challenge for providing fabric softeners in dissolvable sheet form has been that traditional softening actives have poor water solubility, by design. Softening actives must attach to textile surfaces and become dispersed thereon, forming a coating on the textile fibres. If they are overly soluble, they will not properly coat textiles and will therefore be ineffective as softening agents.

The inventors have learned through their product formulation trials that the poor compatibility of traditional fabric softening actives with water-soluble structurants in solid product format has meant that such actives tend to leach out from dissolvable sheets. They are not retained over time within the solid matrix, and rapidly form a greasy or waxy coating on the surface of the sheet. The feel of such a coating will be familiar to consumers who utilize non-dissolvable fabric softening sheets, often made of nonwoven polypropylene and impregnated with fabric softening actives used with the laundry in the dryer. Such a coating has been less problematic for non-dissolvable sheets, which can be stacked and readily separated from each other by the consumer due to the integrity of the nonwoven sheet. However, this coating is likely to cause issues for stacked dissolvable sheets if the active ingredients migrate out therefrom. Dissolvable sheets tend to be more delicate and prone to tearing if they adhere to each other.

Although fabric softening active ingredients tend to be poorly soluble, if a dissolvable fabric softener sheet is to be provided, the actives must be mixed with and remain immobilized in solid form in the company of the water-soluble structurants used.

It would be beneficial to provide a dissolvable sheet that overcomes the above challenges, is readily dissolvable in water, and provides at least equal softening ability to some of the conventional forms of fabric softener.

SUMMARY

Dissolvable fabric softener sheets have been invented which are readily dissolvable in the wash cycle of a home laundry machine, yet remain stable for long periods when stored at room temperature. The dissolvable sheets have a low moisture content, and are therefore lightweight and easy to ship and store, while providing highly concentrated doses of textile softening power.

The sheet in one form comprises surfactants as well as cationic and/or amphoteric polymer softening agents. The sheet may also include additional surfactants as well as polyvinyl alcohol (PVA), starch, and glycerol as structurants.

The sheet has a relatively high proportion of structurants as compared to, for example, dissolvable detergent sheets, at a level of approximately 45-60%. Preferred structurants include starch and polyvinyl alcohol. These structurants contribute to the stability of the sheet, and beneficially, are compatible with polymer-based softening agents. This compatibility combined with the high proportion of structurants results in the softening actives being retained within the matrix of the sheet rather than migrating out therefrom.

A method of formulating the sheets of the invention is also provided. A master batch slurry comprising surfactants, softening agents, and structurants including PVA, starch and glycerol is mixed and spread to form a thin layer on the surface of a heated rotating drum. As the drum rotates, liquid evaporates from the master batch formulation on the drum surface and a thin solid sheet of fabric softening composition remains. The sheet is then cut into portions for single use by the consumer, and packaged.

Accordingly, in one aspect of the invention, a fabric softening dissolvable sheet product is provided which consists of surfactants, amphoteric and/or cationic polymer-based softening agents, and base structurants. The dissolvable sheet readily dissolves and distributes fabric softening actives in a wash load of a home laundry machine. The dissolvable sheet may be placed into the designated trays for fabric softeners of a front loading machine, but more preferably will be placed directly into the drum with the laundry load, simultaneously with the detergent at the beginning of the wash cycle, for better dissolution. The sheet is lightweight, having low levels of water, generally under 10%, and remains stable for long periods under typical conditions of storage at room temperature. In terms of softening ability and static reduction, the fabric softening dissolvable sheet used with a detergent performed at least comparably, and in some embodiments, better, than a liquid commercial 2-in-1 detergent/fabric softener used as a benchmark.

In a further aspect of the invention, a method of manufacturing a fabric softening dissolvable sheet product is provided.

In a still further aspect of the invention, a use is provided of such a fabric softening dissolvable sheet to soften textiles.

There are a number of advantages to the present invention. The present fabric softener dissolvable sheet product is highly efficaceous, dissolving and dispersing readily in water and providing softening ability and static reduction, at least comparable, or in some embodiments, better than a benchmark 2-in-1 detergent/fabric softener product. The dissolvable sheet is lightweight and easy to ship and store. The dissolvable sheet utilizes cationic or amphoteric polymer softening agents, or a mixture of both. The dissolvable sheet is also stable at room temperature, and does not suffer from the problems of migration or leaching of softening actives from the solid matrix of the sheet. Thus, the invention provides a beneficial balance between efficacy, ease of use, and stability.

These and other aspects of the invention will become apparent from the description that follows.

DETAILED DESCRIPTION

Provided herein is a novel fabric softening product in the form of a dissolvable sheet. The product is designed to be used simultaneously with detergent in a home laundry washing machine, preferably being placed with the detergent in the main drum of the washing machine with the laundry load. The dissolvable sheet is highly concentrated in terms of active ingredients, convenient to use, stable at room temperature, and overcomes many of the difficulties inherent in formulating a solid dissolvable version of a fabric softener.

As mentioned above, the more widely used fabric softening actives cannot be successfully incorporated into a water-soluble sheet format, often because the softening actives are inherently poorly soluble in water. To formulate a sheet, it is necessary to mix the active ingredient into a slurry, which can then be formed into a sheet that must remain stable until it is used. It was discovered by the inventors through multiple trial formulations that most conventional fabric softening actives result in failure at the slurry stage, with the mixture separating almost immediately, or at the sheet stage, whereby sheets cannot be formed at all, or the fabric softening active is not stable once incorporated therein. As well, to be provided in a practical form for use by a consumer, sheets must be sufficiently small in size. Therefore active ingredients in the sheet must be in concentrated form. Many fabric softening actives are dilute in terms of softening power, cannot be incorporated in concentrated form, and therefore cannot be accommodated in a solid sheet without making the sheet overly large and impractical for consumer use.

As examples of the above difficulties in utilizing known fabric softening actives, silicone based softening actives are well known. Slurries incorporating such silicones were found to separate almost immediately. Known cationic surfactant and bentonite softening actives can be effective at softening textiles when incorporated in a large volume such as in a liquid fabric softener, but their softening power is too dilute for them to be successfully incorporated into a slurry for sheet formulation. Esterquats and diamidoquats are also well known and commonly used fabric softening actives, and they could successfully be used to make a slurry and sheets, however, these actives would rapidly leach out from the sheets after formation, rendering them unusable. Additional examples of known fabric softening actives with which one or more of the above manufacturing issues occur include: dialkyl dimethyl ammonium chloride, cationic imidazolinium salts, cationic quaternary ammonium salts, and imidazolinium quats.

As described below, it was discovered that using cationic or amphoteric polymers as softening agents, when combined with an anionic surfactant, results in stable and efficaceous sheets which provide effective softening power when used with textiles.

Cationic Polymer Softening Agents

Preferred embodiments of the formulation of the invention may comprise anionic surfactant combined with a cationic polymer as a softening ingredient, preferably a cationic polysaccharide. In particular, a cationic inulin polysaccharide is most preferred.

Inulin is a fructan, a type of soluble fiber found in some plant foods such as chicory and beets. It has been known to form part of a waste product from the processing of sugar beets for food materials, and was traditionally discarded. However, the COSUN family of companies developed methods for processing the inulin portion of the waste product into hydroxypropyltrimonium inulin. The ingredient has since been commercialized and is marketed under the QUATIN brand name, as a cationic biopolymer suitable for inclusion in products as diverse as those for personal care, pharmaceuticals, and cleaners for hard surfaces. It is advantageous environmentally because it is both naturally sourced and biodegradable, unlike traditional fabric softening actives which have often been entirely synthetic or derived from petroleum or palm oil.

As described below, it has been discovered that when QUATIN ingredients are used in the fabric softening formulation of the invention, they provide effective softening to textiles. When combined with anionic surfactants, QUATINs form a coacervate that precipitates on fabrics, leaving them softer and with better handfeel.

While not wishing to be bound by theory, the effectiveness of such cationic biopolymers as fabric softening agents is believed to be due to their net positive charge and the impact when combined with the right proportion of an anionic surfactant. In general, cationic biopolymers are water-soluble, and if added to a wash cycle, will not form a coating on the fabrics as they will simply be rinsed away. However, when combined with an anionic surfactant, the cationic biopolymers due to their net positive charge will precipitate with the anionic surfactant to form solid particles, which will more readily form a coating on fabric surfaces.

Preferred ingredients from the QUATIN line for use with the invention include QUATIN 680 and QUATIN 1280, which differ in their degrees of substitution and molecular weights. These particular ingredients have complimentary effects for softening textiles. For instance, QUATIN 1280 is a larger molecule and will tend to coat textiles to provide good handfeel on the surface. The QUATIN 680 is a smaller molecule and will better integrate with the internal fibres of the textiles, and tends to provide better static reduction. The skilled person can adjust levels of different QUATIN actives to determine which proportions are optimal for the types of textiles at issue.

As set out in the detailed formulations provided below, the amount by weight of QUATIN ingredients, when used with the specified amount of the anionic surfactant alpha-olefin sulfonate (AOS) in a ratio of approximately 1.7-2 parts AOS: 1 part total QUATINs, will result in an effective fabric softening formulation. Inulin polysaccharides such as those in the QUATIN line have never been used in any commercial fabric softening compositions available in dissolvable sheet form, to the best of the inventors' knowledge.

Other cationic polymers could also be substituted for the QUATINs, but depending on their molecular weights, charge densities, and degrees of branching, the corresponding amount of anionic surfactant will need to be adjusted to optimize the level of coacervation. Other cationic polymers that can be utilized in this manner include other cationic polysaccharides such as cationic guar, polyquaternary pyridinium salt derivatives, cationic silicone polymers, co-poly 4-vinylbenzyltrialkylammonium salts, co-poly 2-alyl 1-vinyl imidazolium salts, co-poly dimethyl aminopropylmethacrylamide, polyquaterniums, and quaternized polyimidazolines.

Using cationic polysaccharides such as inulin is advantageous for the stability of the sheet formulation. Most softening active ingredients are difficult to immobilize in a solid matrix. Inulin itself is water-soluble and stable in sheet form, and compatible with starch and PVA, which provide bulk to the sheet. Many other more typical softening actives, if included in a sheet format, tend to migrate out of the solid matrix and cause a greasy feel to the surface of the sheet. This is not only unappealing to the consumer, but unworkable in a packaged consumer product. Sheets in typical packaging are stacked, and dissolvable sheets must not overly adhere to one another, as they will be difficult for the consumer to separate without damage. Beneficially, using the formulation of the invention, the sheets remain dry and intact, with no migration observed for the softening active out of the solid matrix.

Amphoteric Polymer Softening Agents

Other preferred embodiments of the invention may comprise an anionic surfactant combined with an amphoteric polymer as a softening ingredient, preferably an amphoteric polyquaternium. In particular, a copolymer of diallyl-dimethyl ammonium chloride and acrylic acid is most preferred.

The inventors successfully utilized as an amphoteric polymer softening agent an ingredient with the trade name NOVERITE 301, which is marketed by the LUBRIZOL Corporation. NOVERITE 301 is a trade name for polyquaternium-22, and is a copolymer of diallyl-dimethyl ammonium chloride and acrylic acid. This ingredient has been used in cosmetics, but this is the first time to the best of the inventors' knowledge that this ingredient was successfully used in a laundry product.

In some formulations as described below, NOVERITE 301 was combined with additional polymers such as Polyquaternium-7 and Polyquaternium-67, which are cationic polymers available from Dow. When using a softening active like Polyquaternium-67, which is a polymer containing long chains and having a high charge density, the amount of surfactant must be carefully selected for the formulation. For instance, using too much anionic surfactant such as alpha-olefin sulfonate in a formulation which includes polyquaternium-67 will cause these ingredients to precipitate out of solution, and the required coacervation function will not properly occur. Alternatively, using too little anionic surfactant will prevent the coacervation function from initiating.

When amphoteric polymer softening agents such as NOVERITE 301 are used in the fabric softening formulations of the invention, effective softening and static reduction is provided to textiles. When combined with surfactants including anionic surfactants, similarly to the explanation provided above for the behaviour of cationic softeners, the amphoteric softeners effectively form a coacervate that deposits onto fabrics, leaving them softer and with better handfeel.

Surfactants

Multiple surfactants may also be included in the formulation of the invention. While it is important to include at least one anionic surfactant as the primary surfactant, further surfactants may be nonionic, amphoteric, or a combination thereof. Many are available in the homecare products field. An anionic surfactant that may be successfully used is alpha-olefin sulfonate. Others that may be useful include sodium lauryl sarcosinate (available under the trade name EVERSOFT S-12), or linear alkyl benzene sulfonic acids, sodium salts of fatty acids, sulfosuccinates of fatty acids, ammonium lauryl sulfate, sodium lauryl sulfate, and sodium laureth sulfate, all of which are available from multiple sources. Glycereth-6-cocoate is a surfactant which also serves as a release agent during manufacturing so that the slurry is less likely to stick to kettles or drums, thus providing a dual advantage.

Additional Softening Actives

Other softening actives may be included in the formulation in a supplemental fashion in order to boost the softening performance of the primary softening actives, the cationic or amphoteric polymers. Small amounts (less than 2% by weight) of silicone-based softeners such as di-methyl-polysiloxanes, organopoly siloxanes with carboxyl groups, modified epoxy alkyl silicone compounds, clay-based softeners such as bentonite, diamidoamine quats, and esterquats may be utilized. When used, it is important to keep the levels of additional softening actives low so that they are less prone to migrating from the sheet and disrupting its integrity.

Structurants

As mentioned earlier, PVA and starch are readily available structurants that are useful for formation of water-soluble sheets. Glycerol is another structurant which also has a dual purpose, in that it also serves as a processing aid. Glycerol is often termed a "plasticizer" because it assists in the manufacturing process by increasing the flowability and viscosity of the liquid fabric softener formulation.

Release Agents

Further release agents are also beneficial. As described further below, the sheet product may be made as a concentrated slurry which is then spread onto a heated rotating drum, and dried into sheet form. As such, additional ingredients such as release agents are beneficial so that the slurry does not overly adhere to manufacturing surfaces such as the drum, or the insides of industrial kettles in which the slurry is processed. Release agents that may be so used include the aforementioned glycereth-6-cocoate (also a surfactant), which provides good release capabilities. Glycereth-6-cocoate is available from KAO Corporation and is sold under the brand name LEVENOL. Another release agent that may be successfully utilized is NEOBEE, consisting of medium chain triglycerides, and available from STEPAN Corporation. Many other release agents are available in the market and can be successfully used, subject to compatibility with the other ingredients.

Additional Ingredients

Optionally, fragrances may also be added to impart a pleasant odour to the product and to the textiles with which it is used. Encapsulated fragrances work particularly well for dried and concentrated product formats, and are available from a number of sources.

Dispersing agents may also be included. Dispersing agents facilitate even suspension of ingredients through the liquid phase of the formulation. In particular, the inventors discovered a further beneficial effect when liquid cellulose (CELLULON R-25 marketed by CP-Kelco) was included as the dispersing agent. When cellulose was used, the fragrance was observed in internal panel tests to survive the heat drying step. The fragrance continued to emanate from the textiles upon removal from the dryer, and remained detectable through long periods of use or wear of the textiles.

Use of a dispersing agent therefore has the surprising result that the fragrance lasts much longer on the textiles. It is believed that the dispersing agent results in deeper embedding of encapsulated fragrance within the fibres of the textiles, which protects the encapsulated particles during the heat drying process. The encapsulated particles then continue to rupture as the textiles are further handled or worn, releasing further amounts of fragrance. This results in a longer lasting sensory benefit that is appealing to users of this product.

In a preferred embodiment of the formulation, in the slurry prior to drying into sheet form on a heated drum, cationic inulin polysaccharides are provided at a percentage of 5.00-20.00% by weight, more preferably 10.00-15.00% by weight, and are the primary source of softening action for the formulation. Surfactants are also included, the specific amount depending on the surfactant at issue. If AOS is used with the cationic inulin polysaccharides listed in the formulation below, AOS should be provided in a ratio of approximately 1.5-2:1. With reference to the ranges provided above for the cationic inulin polysaccharides, AOS should preferably be provided at corresponding weight percentages of 15.00-30.00%, or more preferably 18.00-25.00%.

In further preferred embodiments of the formulation, the ingredients in the slurry prior to drying into sheet form on a heated drum are provided below, with amphoteric polymers being provided at a percentage of 0.5-5.0% by weight, more preferably 1.0-2.0% by weight, providing the primary source of softening action for the formulation. Surfactants are also included, the specific amount depending on the surfactant at issue.

Structurants such as PVA, glycerol, and starch may be included in the slurry in a total amount in the range of 15.0-30.0% by weight. Water is also included in the range of approximately 35.0-65.0% by weight.

Sample formulations for the slurry which is later dried in accordance with the outlined manufacturing method is shown below. Also provided is the corresponding amount of ingredients in a 100 mm×100 mm dissolvable sheet made from the slurry. In the formulations, certain ingredients such as fragrances, pH adjustors, dispersing agent, and release agents are optional.

TABLE 1

Formulation FB5

| Ingredient | Function | Amount (% weight) in slurry | Amount (% weight) in solid sheet |
|---|---|---|---|
| Polyvinyl Alcohol | Structurant | 11.5 | 25.7 |
| Starch | Structurant | 7.0 | 15.9 |
| Glycerol | Plasticizer/ Structurant | 1.9 | 4.5 |
| Alpha-Olefin Sulfonate | Surfactant | 22.9 | 21.5 |
| Glycereth-6-Cocoate | Surfactant/Release Agent | 2.1 | 4.50 |
| Inulin-based Polysaccharides | Softener | 13.7 | 11.5 |
| Medium chain triglycerides | Release Agent | 1.3 | 3.1 |
| Citric Acid | pH adjustment | 0.3 | 0.8 |
| Water | Solvent | q.s. | q.s. |

A sample scented formulation for the slurry is shown below. Also provided is the corresponding amount of ingredients in the dissolvable sheet made from the slurry.

TABLE 2

Formulation S111

| Ingredient | Function | Amount (% weight) in slurry | Amount (% weight) in solid sheet |
|---|---|---|---|
| Polyvinyl Alcohol 15/15 | Structurant | 11.1 | 24.5 |
| Starch | Structurant | 9.4 | 21.1 |
| Glycerol | Plasticizer/ Structurant | 1.9 | 4.3 |
| Alpha-Olefin Sulfonate | Surfactant | 20.3 | 18.8 |
| LEVENOL (Glycereth-6-Cocoate) | Surfactant/ Release Agent | 1.9 | 4.2 |
| QUATIN 680 (Inulin-based Polysaccharide) | Softener | 6.5 | 5.4 |
| QUATIN 1280 (Inulin-based Polysaccharide) | Softener | 6.5 | 5.4 |
| Citric Acid | pH adjustment | 0.3 | 0.7 |
| NEOBEE (Medium Chain Triglycerides) | Release Agent | 0.9 | 2.2 |
| Fragrance (Encapsulated) | Fragrance | 1.6 | 1.0 |
| CELLULON R-25 (Cellulose) | Dispersing Agent | 1.6 | 0.3 |
| Water | Solvent | q.s. | q.s. |

A further sample scented formulation for the slurry utilizing an amphoteric surfactant is shown below. Also provided is the corresponding amount of ingredients in the dissolvable sheet made from the slurry.

TABLE 3

Formulation AP1

| Ingredient | Function | Amount (% weight) in slurry | Amount (% weight) in solid sheet |
|---|---|---|---|
| Polyvinyl Alcohol | Structurant | 18.8 | 24.6 |
| Starch | Structurant | 8.4 | 22.4 |
| Glycerol | Plasticizer/ Structurant | 4.5 | 11.8 |
| Alpha-Olefin Sulfonate | Anionic Surfactant | 1.7 | 4.5 |
| Sodium Lauroyl Sarcosinate (EVERSOFT S-12) | Anionic Surfactant | 7.5 | 19.7 |
| Glycereth-6-Cocoate (LEVENOL) | Surfactant/Release Agent | 1.9 | 5.0 |

TABLE 3-continued

| Formulation AP1 | | | |
|---|---|---|---|
| Ingredient | Function | Amount (% weight) in slurry | Amount (% weight) in solid sheet |
| Polymer of diallyl-dimethyl ammonium chloride and acrylic acid (Polyquaternium-22; NOVERITE 301) | Amphoteric Softening Agent | 1.1 | 3.0 |
| Medium Chain Triglycerides (NEOBEE) | Release Agent | 0.65 | 1.7 |
| Encapsulated Fragrance | Fragrance | 1.4 | 1.0 |
| Cellulose | Dispersing Agent | 0.04 | 0.1 |
| Water | Solvent | q.s. | q.s. |

A further sample formulation for the slurry, which includes release agents as processing aids, is shown below. Also provided is the corresponding amount of ingredients in the dissolvable sheet made from the slurry.

TABLE 4

| Formulation AC2 | | | |
|---|---|---|---|
| Ingredient | Function | Amount (% weight) in slurry | Amount (% weight) in solid sheet |
| Polyvinyl Alcohol | Structurant | 10.1 | 27.1 |
| Starch | Structurant | 8.4 | 22.7 |
| Glycerol | Plasticizer/ Structurant | 1.2 | 10.0 |
| Cocamidopropyl hydroxysultaine (FOAMER HS) | Amphoteric surfactant | 14.7 | 20.0 |
| Linear Ethoxylated Alcohol | Nonionic Surfactant | 0.4 | 1.1 |
| Sodium Lauroy)l Sarcosinate (EVERSOFT S-12) | Anionic Surfactant | 0.3 | 0.8 |
| Glycereth-6-Cocoate (LEVENOL) | Surfactant/ Release Agent | 1.8 | 4.8 |
| Polymer of diallyl-dimethyl ammonium chloride and acrylic acid (Polyquaternium-22; NOVERITE 301) | Amphoteric Softener | 1.8 | 2.0 |
| Polyquaternium-67 | Cationic Softener | 0.5 | 1.2 |
| Medium Chain Triglycerides (NEOBEE) | Release Agent | 1.1 | 3.0 |
| Encapsulated Fragrance | Fragrance | 1.4 | 1.0 |
| Cellulose (BETAFIB ETD) | Dispersing Agent | 0.04 | 0.1 |
| Water | Solvent | q.s. | q.s. |

Formulation Method

For formulating fabric softener sheets of the present invention, slurries of high viscosity are made in accordance with formulations such as the above. The industrial batch size of the slurry may be in the range of 50-60 kg, and is mixed for at least 40 minutes in a standard homogenizing mixer at ambient temperatures. The viscosity of the slurry is in the range of 41.5 cpas, and pH is adjusted to around 4.7. Citric acid may be used for pH adjustment. Citric acid also has the additional benefit of eliminating an unpleasant fishy odour that results from airborne amines that may emanate from the slurry, and the resulting sheets. The citric acid reacts with the amines to form salts that remain in solution, thereby eliminating the odour.

Slurry made in accordance with the above conditions will be stable for 2-3 days in a closed container.

Slurry prepared according to the above general method may then be applied to coat the surface of a rotating, heated drum, on which the slurry will form a sheet of concentrated fabric softening formulation. Sheets may be formed having a thickness of about 0.7 mm+/−0.2 mm. They can then be processed into single-use portions. For example, it is convenient to cut the sheet into 2-use portions consisting of a sheet of dimensions of approximately 100 mm×100 mm, having a center perforation that allows the user to later separate the two single-use portions suitable for use to soften a medium-sized load of laundry. A standard industrial sized batch of slurry of 50-60 kg will yield thousands of sheets, which correspond to over 10,000 single use portions. The weight of each sheet is approximately 3.2 g+/−0.5 g. Testing of the sheets has demonstrated that time to total dissolution in stirred, cold water is 20-25 seconds.

As described above, the present invention corresponds to a solid, dissolvable sheet containing fabric softener made from a slurry, according to any of the preceding formulations, from which substantial portions of the water content have been removed by evaporation. The solid dissolvable sheet may comprise as percentages by weight of the final formulation:

(a) about 45.0-60.0% structurants;
(b) about 20.0-30.0% anionic surfactants;
(c) about 10.0-15.0% cationic polymers, preferably polysaccharides;

the proviso being that (a) to (d) must add up to 100%.

The present invention further corresponds to dissolvable fabric softening sheets, comprising as percentages by weight of the final formulation:

(a) about 45.0-60.0% structurants;
(b) about 20.0% anionic surfactants;
(c) about 10.0-12.0% cationic polymers, preferably polysaccharides;
(d) water;

the proviso being that (a) to (d) must add up to 100%.

The present invention further corresponds to dissolvable fabric softening sheets, comprising as percentages by weight of the final formulation:

(a) about 45.0-60.0% structurants including polyvinyl alcohol, starch, and glycerol;
(b) about 20.0% anionic surfactants including alpha-olefin sulfonate;
(c) about 10.0-12.0% cationic polysaccharides including inulin polysaccharides;
(d) about 2.0-5.0% release agents;
(e) water;

the proviso being that (a) to (e) must add up to 100%.

The present invention further corresponds to dissolvable fabric softening sheets, comprising as percentages by weight of the final formulation:

(a) about 45.0-60.0% structurants including polyvinyl alcohol, starch, and glycerol;
(b) about 20.0% anionic surfactants including alpha-olefin sulfonate;
(c) about 10.0-12.0% cationic polysaccharides including inulin polysaccharides;
(d) about 2.0-5.0% release agents;
(e) about 0.5-0.8% citric acid;
(f) water;

the proviso being that (a) to (f) must add up to 100%.

The present invention further corresponds to dissolvable fabric softening sheets, comprising as percentages by weight of the final formulation:

(a) about 45.0-60.0% structurants including polyvinyl alcohol, starch, and glycerol;
(b) about 20.0% anionic surfactants including alpha-olefin sulfonate;
(c) about 10.0-12.0% cationic polysaccharides including inulin polysaccharides;
(d) about 2.0-5.0% release agents;
(e) about 0.8% citric acid;
(f) about 1.0% fragrance;
(g) about 0.3% dispersing agent;
(h) water;
the proviso being that (a) to (h) must add up to 100%.

The present invention further corresponds to dissolvable fabric softening sheets, comprising as percentages by weight of the final formulation:
(a) about 50.0-60.0% structurant;
(b) about 25.0-30.0% surfactants;
(c) about 1.0-5.0% amphoteric polymers;
(d) water;
the proviso being that (a) to (d) must add up to 100%.

The present invention further corresponds to dissolvable fabric softening sheets, comprising as percentages by weight of the final formulation:
(a) about 50.0-60.0% structurant;
(b) about 25.0-30.0% surfactants;
(c) about 1.0-5.0% amphoteric polymers;
(d) water;
the proviso being that (a) to (d) must add up to 100%.

The present invention further corresponds to dissolvable fabric softening sheets, comprising as percentages by weight of the final formulation:
(a) about 50.0-60.0% structurant;
(b) about 25.0-30.0% surfactants;
(c) about 2.0-3.0% amphoteric polymers;
the proviso being that (a) to (d) must add up to 100%.

The present invention further corresponds to dissolvable fabric softening sheets, comprising as percentages by weight of the final formulation:
(a) about 50.0-60.0% structurant;
(b) about 25.0-30.0% surfactants, selected from one or more of anionic, amphoteric, and nonionic surfactants;
(c) about 2.0-3.0% amphoteric polymers, preferably a copolymer;
(d) water;
the proviso being that (a) to (d) must add up to 100%.

The present invention further corresponds to dissolvable fabric softening sheets, comprising as percentages by weight of the final formulation:
(a) about 50.0-60.0% structurants, selected from one or more of polyvinyl alcohol, starch, and glycerol;
(b) about 25.0-30.0% surfactants, selected from one or more of anionic, amphoteric, and nonionic surfactants;
(c) about 2.0-3.0% amphoteric polymers, preferably including polyquaternium-22;
(d) about 1.5-3.0% of a release agent;
(e) water;
the proviso being that (a) to (e) must add up to 100%.

The present invention further corresponds to dissolvable fabric softening sheets, comprising as percentages by weight of the final formulation:
(a) about 50.0-60.0% structurants, selected from one or more of polyvinyl alcohol, starch, and glycerol;
(b) about 25.0-30.0% surfactants, selected from one or more of anionic, amphoteric, and nonionic surfactants;
(c) about 2.0-3.0% amphoteric polymers, preferably including polyquaternium-22;
(d) about 1.5-3.0% of a release agent;
(e) about 1.0% of a fragrance;
(f) about 0.1% of a dispersing agent;
(g) water;
the proviso being that (a) to (g) must add up to 100%.

As used herein, the term "about" refers to an amount within 10% or less of the indicated amount, and preferably an amount within 5% or less, wherein the amount is either greater or less than the indicated amount. This applies to all numbers in this description indicating amounts or ratios of material, conditions of reaction, or physical properties and dimensions of materials.

The present invention also corresponds to a method of manufacturing the above dissolvable sheets as outlined above.

The present invention also corresponds to the above dissolvable sheets when made in accordance with the methods described herein.

The present invention also corresponds to a dissolvable fabric softener sheet comprising an encapsulated fragrance for providing a scent to textiles, into which a dispersing agent is also incorporated to increase the adsorption of the scent onto textiles.

The present invention also corresponds to use of the above dissolvable sheets to soften fabrics.

Stability Testing

The sheets of the invention can be provided in standard box or envelope-style packaging. When stacked therein, the sheets do not adhere to each other even following long periods of storage under typical ambient conditions of humidity and temperature. No migration of active ingredients from the sheets has been observed. In conditions of very high humidity such as in tropical conditions, the sheets can absorb water from the air and become tacky, but they remain stable and readily separable.

For dissolvable sheets, standard testing procedure in the field is to incubate stacked sheets in their recommended packaging in an oven set to 60° C. for 21 days. Following the incubation period, sheets are examined to determine if any ingredients have separated from the solid matrix of the sheets, and formed a coating on the outside of the sheet or have caused adjacent sheets to adhere to each other. If the sheets maintain their integrity at 60° C. for 21 days, they are considered to have at least two years of shelf life in standard ambient conditions of temperature and humidity.

Each of the formulations described above for the invented fabric softener dissolvable sheets were tested in the above manner, and were found to survive the incubation period 60° C. for 21 days, entirely intact. Qualitative observations confirmed that no ingredients migrated from the solid matrix, and the sheets remained dry to the touch and did not adhere to each other. The invented sheets have thus been confirmed to have at least two years of shelf life in ambient conditions of temperature and humidity.

Efficacy Testing-Softness

Efficacy testing was also performed to assess the fabric softening and static reduction abilities of the invented sheets. A third party independent laboratory performed testing in accordance with HCPA DCC-13—Performance Test Methods and Guidelines—Fabric Softeners. A standard laundry load consisting of looped cotton hand towels was tested by washing and drying in a specified Whirlpool washing machine and dryer in accordance with the published test methods. Comparisons were performed between loads agitated with: TIDE Original detergent (42.5 mL) with no softener; ATTITUDE 2-in-1 Laundry Detergent & Fabric Softener (30 mL), and TRU EARTH strip laundry detergent (1 strip) combined with fabric softener strips made in accordance with the invention, identified by codes FB5, AP1, and AC2. Dosages chosen for each detergent and softener were based on the manufacturer's recommended amounts for small loads.

To test softness, after washing and drying, relative softness of the hand towels was evaluated. Prior to the evaluations of softness, the towels were conditioned in a constant humidity room for at least 24 hours. Panelists were then tasked with scoring the towels from 1 to 5, with 1 being the least soft and 5 being the softest. After each test the scores were totaled and averaged to give a single rating for each product.

The results are as shown below:

TABLE 5

Relative Softness of Hand Towels - Test 1

| Detergent | Softener | Softness Rating |
|---|---|---|
| TIDE Original | None | 1.8 |
| ATTITUDE 2-in-1 Laundry Detergent and Fabric Softener (Mountain Essential) | No additional fabric softener | 3.9 |
| TRUEARTH laundry detergent sheet, unscented (1 Strip) | AP1, 1 strip, 1 cycle | 4.4 |
| TRUEARTH laundry detergent sheet, unscented (1 Strip) | AC2, 1 strip, 1 cycle | 3.6 |

Test 1 shows softness comparable to the benchmark 2-in-1 detergent and fabric softener for the invented fabric softener strips, with AP1 having greater softness than the benchmark.

TABLE 6

Relative Softness of Hand Towels - Test 2

| Detergent | Softener | Softness Rating |
|---|---|---|
| TIDE Original | None | 1.0 |
| ATTITUDE 2-in-1 Laundry Detergent and Fabric Softener (Mountain Essential) | No additional fabric softener | 2.8 |
| TRUEARTH laundry detergent sheet, unscented (1 Strip) | FB5, 1 strip | 3.7 |

Test 2 shows softness better than the benchmark was achieved by the invented strip FB5.

As shown in the test results, the control with no softening actives being added had the lowest softness rating. The comparison standard used in each test was a 2-in-1 detergent and fabric softener. The invented fabric softener strips, each placed in the wash cycle along with a standard detergent strip, and run for one cycle, achieved comparable or better softness ratings as the benchmark.

These results establish that the invented fabric softener sheets are comparably effective, and in some cases more effective in terms of softening power compared to a standard 2-in-1 detergent fabric softener product. The results were statistically significant and the standard deviation was less than +/−0.5.

Efficacy Testing-Static Reduction

To test static reduction, after washing and drying, relative peak static charges of bed sheets in two materials-cotton and a polyester-cotton blend-were evaluated. After the sheets were laundered, they were placed in a standard tumble dryer for 50 minutes at a high temperature setting. Immediately following removal of the towels, peak static charge was measured in kV and recorded. The higher the peak static charge, the greater the amount of static electricity accumulated on the fabric. After each test the scores were totaled and averaged to give a single rating for each product.

The results are as shown below for a strip made in accordance with formulation AC2.

TABLE 7

Peak Static Charge on Laundered Fabrics

| Detergent | Softener | Peak Static Charge (kV) - Cotton | Peak Static Charge (kV) - Poly-Cotton |
|---|---|---|---|
| TIDE Original | None | 12.2 | 8.6 |
| ATTITUDE 2-in-1 Laundry Detergent and Fabric Softener (Mountain Essential) | No additional fabric softener | 12.4 | 5.7 |
| TRUEARTH laundry detergent sheet, unscented (1 Strip) | AC2, 1 strip, 1 cycle | 5.4 | 4.0 |

As shown in the test results, static charge was not reduced in the two benchmark samples. However, static charge was significantly reduced using the invented strip AC2.

These results establish that the invented AC2 fabric softener sheet was more effective in terms of static reduction compared to benchmarks, including a standard 2-in-1 detergent fabric softener product. The results were statistically significant and the standard deviation was less than +/−0.5.

Tensile Strength Testing

One of the formulations was also tested for a protective effect on textiles. It is known that with repeated washing and drying, textile fibers weaken over time. Laundry formulations can be tested to determine if they have any protective effect on textiles, using standard test methods such as ASTM D2261-13, a standard tear strength test. In this test, swatches of textiles are laundered and dried for five cycles using specified models of washing machines and dryers, and then tested in a tensile testing machine to determine the amount of force, measured in Newtons, required to tear the fabric. Averages were calculated for each test. The higher the force required, the stronger the fabric.

The fabrics tested were polyester and cotton. As shown below, a protective effect can be seen for a fabric softener strip of the invention (formulation FB5) for polyester fabric.

TABLE 8

Tensile Tear Strength Test for FB5

| | Polyester | | Cotton | |
|---|---|---|---|---|
| Sample | Average Force (N) | Std. Dev. | Average Force (N) | Std. Dev. |
| Unwashed Control | 53.85 | 3.01 | 4.85 | 0.25 |
| TIDE Original Detergent (no softener) | 47.40 | 4.45 | 4.90 | 0.43 |
| ATTITUDE 2in1 Detergent + Softener | 47.45 | 4.42 | 5.07 | 0.48 |
| TRU EARTH detergent strip (no softener) | 45.76 | 2.78 | 5.00 | 0.41 |
| TRU EARTH detergent strip + FB5 softener strip | 53.87 | 3.19 | 4.80 | 0.57 |

As shown above, there was an increase in resistance to tearing, as reflected in a higher force needed to tear the fabric samples, for polyester, but not for cotton. For polyester, washing the fabric in detergent alone does result in weakening the fabric, as seen in comparing the unwashed control to TIDE and TRU EARTH without softener. Addition of the invented fabric softener, formulation FB5, provides a statistically significant strengthening impact for polyester fibres as compared to the benchmark ATTITUDE 2-IN-1 which also contained fabric softener. This is likely because the fabric softener as formulated in FB5 coats the fiber to provide a protective effect. This is a further benefit of the invented fabric softener formulation.

SUMMARY

The invention has therefore been confirmed to provide a highly concentrated and stable fabric softener as a readily dissolvable sheet. In addition to being made as a convenient sheet format which is easier to store and lighter to ship, the product is also beneficial environmentally, as the use of the dissolvable sheet format means that fabric softening is attained with less generation of waste. The invented product is therefore a significant improvement in terms of environmental impact compared to traditional fabric softening products.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble sheet, comprising by weight:
(a) 25.7% polyvinyl alcohol;
(b) 15.9% starch;
(c) 4.5% glycerol;
(d) 21.5% alpha-olefin sulfonate;
(e) 4.5% glycereth-6-cocoate;
(f) 11.5% cationic inulin polysaccharide;
(g) 0.8% citric acid; and
(h) water q.s.,
wherein the cationic inulin polysaccharides does not migrate from the sheet when incubated at 60° C. for 21 days.

2. A water-soluble sheet, comprising by weight:
(a) 24.5% polyvinyl alcohol;
(b) 21.1% starch;
(c) 4.3% glycerol;
(d) 18.8% alpha-olefin sulfonate;
(e) 4.2% glycereth-6-cocoate;
(f) 10.8% cationic inulin polysaccharides;
(g) 0.7% citric acid;
(h) 2.2% medium chain triglycerides;
(i) 0.3% cellulose; and
(j) water q.s.,
wherein the cationic inulin polysaccharides does not migrate from the sheet when incubated at 60° C. for 21 days.

3. A water-soluble sheet, comprising by weight:
(a) 24.6% polyvinyl alcohol;
(b) 22.4% starch;
(c) 11.8% glycerol;
(d) 4.5% alpha-olefin sulfonate;
(e) 19.7% sodium lauroyl sarcosinate;
(f) 5.0% glycereth-6-cocoate;
(g) 3.0% polyquaternium-22;
(h) 1.7% medium chain triglycerides;
(i) 1.0% fragrance;
(j) 0.1% cellulose; and
(k) water q.s.,
wherein the polyquaternium-22 does not migrate from the sheet when incubated at 60° C. for 21 days.

4. A water-soluble sheet, comprising by weight:
(a) 27.1% polyvinyl alcohol;
(b) 22.7% starch;
(c) 10.0% glycerol;
(d) 20.0% cocamidopropyl hydroxysultaine;
(e) 1.1% linear ethoxylated alcohol;
(f) 0.8% sodium lauroyl sarcosinate;
(g) 4.8% glycereth-6-cocoate;
(h) 2.0% polyquaternium-22;
(g) 1.2% polyquaternium-67;
(h) 3.0% medium chain triglycerides;
(j) 1.0% fragrance;
(k) 0.1% cellulose; and
(j) water q.s.,
wherein the polyquaterniums do not migrate from the sheet when incubated at 60° C. for 21 days.

5. A method of softening a textile, comprising: contacting the water-soluble sheet of claim 1 to the textile.

6. A method of softening a textile, comprising: contacting the water-soluble sheet of claim 2 to the textile.

7. A method of softening a textile, comprising: contacting the water-soluble sheet of claim 3 to the textile.

8. A method of softening a textile, comprising: contacting the water-soluble sheet of claim 4 to the textile.

* * * * *